(12) United States Patent
Cole et al.

(10) Patent No.: US 8,252,208 B2
(45) Date of Patent: Aug. 28, 2012

(54) CALCIUM FLUORIDE OPTICS WITH IMPROVED LASER DURABILITY

(75) Inventors: James R Cole, Norwood, NY (US); Keith J Donohue, Walworth, NY (US); Michael Lucien Genier, Horseheads, NY (US); Robert Stephen Pavlik, Jr., Corning, NY (US); Michael William Price, Corning, NY (US); William Rogers Rosch, Corning, NY (US); Jeffrey L Sunderland, Colton, NY (US)

(73) Assignee: Corning Incorporated, Corning, NY (US)

( * ) Notice: Subject to any disclaimer, the term of this patent is extended or adjusted under 35 U.S.C. 154(b) by 44 days.

(21) Appl. No.: 12/603,046

(22) Filed: Oct. 21, 2009

(65) Prior Publication Data
US 2010/0108958 A1 May 6, 2010

Related U.S. Application Data

(60) Provisional application No. 61/110,195, filed on Oct. 31, 2008.

(51) Int. Cl.
C09K 9/00 (2006.01)
G02F 1/00 (2006.01)
B29D 11/00 (2006.01)
G02B 1/00 (2006.01)
C01B 9/08 (2006.01)

(52) U.S. Cl. ......... 252/583; 117/76; 117/904; 264/1.23; 264/40.1; 264/406; 372/41; 372/101; 423/464; 423/467; 428/696; 428/697; 428/699

(58) Field of Classification Search ............... 252/583; 264/1.23, 40.1, 406; 372/101, 41; 117/73, 117/76, 904, 2; 423/464, 467; 428/696, 428/697, 699
See application file for complete search history.

(56) References Cited

U.S. PATENT DOCUMENTS

| | | | |
|---|---|---|---|
| 6,123,764 A | 9/2000 | Mizugaki et al. | |
| 6,309,461 B1 | 10/2001 | Gianoulakis et al. | |
| 6,466,365 B1 | 10/2002 | Maier et al. | |
| 6,630,117 B2 | 10/2003 | Sparrow | |
| 6,649,326 B2 | 11/2003 | Allan et al. | |
| 6,699,408 B2 * | 3/2004 | Mayolet et al. | 264/1.23 |
| 6,702,891 B2 | 3/2004 | Chiba | |
| 6,704,159 B2 | 3/2004 | Ding et al. | |
| 6,806,039 B2 | 10/2004 | Allan et al. | |
| 6,929,694 B2 | 8/2005 | Doguchi | |
| 6,989,060 B2 | 1/2006 | Kuwabara | |
| 7,033,433 B2 | 4/2006 | Li et al. | |
| 2001/0008540 A1 * | 7/2001 | Oba et al. | 372/101 |
| 2003/0104318 A1 | 6/2003 | Allan et al. | |

OTHER PUBLICATIONS

V. Denks et al.; "Dependence of Luminescence Processes and Transmission in Vacuum-Ultraviolet Region on Surface Condition in CAF2 Single Crystals"; Applied Surface Science, 158 (2000) 301-309.

R. Bennewitz et al.; "Bulk and Surface Processes in Low-Energy-Electron-Induced Decomposition of CAF2"; The American Physical Society, Physical Review B; vol. 59, No. 12 (1999), pp. 8237-8246.

T.M. Stephen et al.; "Degradation of Vacuum-Exposed SIO2 Laser Windows"; SPIE, vol. 1848, 1992, pp. 106-109.

V. Denks, et al.; "Excitonic Processes in Pure and Doped CAF2"; J. Phys.: Condens. Matter 11 (1999) 3115-3125.

V. Denks, et al.; "Impurity-Related Excitonic Processes in CAF2:SR"; Phys. Stat. Sol. (a) 191, No. 2, 628-632 (2002).

Hensen et al.; "Space Radiation Testing of Radiation Resistant Glasses and Crystals"; Proceedings of SPIE, vol. 4452 (2001) pp. 54-65.

* cited by examiner

*Primary Examiner* — Bijan Ahvazi
(74) *Attorney, Agent, or Firm* — Walter M. Douglas

(57) ABSTRACT

The invention is directed to calcium fluoride crystal optics with improved laser durability that can be used for the transmission of below 250 nanometer (nm) electromagnetic radiation. The optics consist of $CaF_2$ as the major component and, in one embodiment, at least one dopant/amount selected >0.3-1200 ppm Mg, >0.3-200 ppm Sr, >0.3-200 ppm Ba, while Ce and Mn are <0.5 ppm. The doped crystal and optics made therefrom have a ratio of 515/380 nm transmission loss of less than 0.3 after exposure to greater than 2.8 MRads of γ-radiation.

10 Claims, 4 Drawing Sheets

CALCIUM FLUORIDE OPTICS WITH IMPROVED LASER DURABILITY

CROSS-REFERENCE TO RELATED APPLICATIONS

This application claims the benefit of priority under 35 U.S.C. §119(e) of U.S. Provisional Application Ser. No. 61/110,195 filed on Oct. 31, 2008.

FIELD

The invention is directed to calcium fluoride crystals and optics made therefrom with improved laser durability that can be used for the transmission of below 250 nanometer (nm) electromagnetic radiation.

BACKGROUND

Excimer lasers are the illumination sources of choice for the microlithographic industry. The use of high power lasers, for example, those with pulse energy densities (fluence) above 20 mJ/cm$^2$, with pulse wavelengths below 250 nm (for example, 193 nm and below) can degrade the optics used in laser lithography systems. T. M. Stephen et al., in their article "*Degradation of Vacuum Exposed SiO2 Laser Windows,*" SPIE Vol. 1848, pp. 106-109 (1992), report on the surface degradation of fused silica in an Ar-ion laser. More recently, it has been noticed that there is optical degradation in high peak and average power 193 nm excimer lasers using materials made from substances other than silica.

Ionic materials such as crystals of $MgF_2$, $BaF_2$ and $CaF_2$ are the materials of choice for excimer optical components due to their ultraviolet transparencies and their large band gap energies. Of these three materials, $CaF_2$ is the preferred material due to its cubic crystal structure, performance, quality, cost, and relative abundance. However, the polished but uncoated surfaces of $CaF_2$ optics are susceptible to degradation when exposed to powerful excimer lasers operating in the deep ultraviolet ("DUV") range, for example at 248 and 193 nm and the vacuum ultraviolet ("VUV") range, for example at 157 nm. For lasers operating at 193 nm, 2-9 KHz, with pulse energy densities of 20-80 mJ/cm$^2$, the surfaces of the optical elements made from these ionic materials are known to fail after only a few million laser pulses. In other applications, for example medical lasers, alternate operating parameters could exist such as 193 nm laser fluences of 200 mJ/cm$^2$-1000 mJ/cm$^2$ (very high fluences) and very low repetition rate (for example 10-100 Hz) that may also result in the accelerated failure of such optical elements. The laser damage is thought to be the result of fluorine migration from the crystal optic interior or bulk to the surface where the fluorine is lost to the atmosphere. The loss of fluorine from the $CaF_2$ crystal optic results in the formation of F centers which can then combine to form Ca colloids near the surface and within the bulk. These Ca colloids subsequently increase scatter and heating of the optical element, with eventual catastrophic failure. U.S. Pat. No. 6,466,365 (the '365 patent) describes a method of protecting metal fluoride surfaces, such as of $CaF_2$ optics, from surface degradation by use of a vacuum deposited coating, for example, a silicon oxyfluoride material. While coatings may be sufficient to address surface damage, the microlithographic industry constantly demands greater performance from excimer sources, and consequently from optical components used in connection with excimer laser based systems. Therefore, the laser durability of the bulk material, $CaF_2$, must also be improved by limiting the formation of Ca colloids that result in the eventual failure of the optical element. This solution will either eliminate the problem or greatly extend the bulk durability and consequently the length of time that existing and future optical elements can be used without having to be replaced.

Solutions to the issue of optical element lifetime involving the use of other optical materials, such as $MgF_2$, have been considered. However, it is believed that such materials will also experience degradation similar to that of $CaF_2$ with time, leading to the same requirement; i.e. that the expensive windows be replaced. It is further believed that the degradation problems of $CaF_2$, $MgF_2$, and other fluoride optical materials will be exacerbated with the advent of laser systems operating at wavelengths below 193 nm. Thus, identifying a method to increase the laser durability of the $CaF_2$ bulk appears to be the most straightforward method of achieving the industry demands for improved laser performance.

SUMMARY

In one aspect the invention is directed to doped $CaF_2$ crystals, and optics made therefrom, that can be used in below 250 nm laser systems, including laser microlithographic systems. The optics are made from crystal $CaF_2$ material that has been doped with a selected amount of dopant material, for example without limitation, magnesium (Mg). In a one embodiment the amount of dopant is less than 2500 ppm. In another embodiment the amount of dopant is >0 and ≦1200 ppm. In a further embodiment the amount of dopant is >0 and ≦500 ppm. In yet another embodiment the amount of dopant is >0 and ≦200 ppm.

In one aspect, the invention is directed to a laser optic having improved laser durability, said optic comprising a $CaF_2$ crystal material doped with a selected amount of a selected dopant, and said optic having a ratio of 515/380 nm transmission loss of less than 0.3 after exposure to greater than 2.8 MRads of γ-radiation. In one embodiment the dopant and amount is selected from the group consisting of >0.3-1200 ppm Mg, >0.3-200 ppm Sr, >0.3-200 ppm Ba. In another embodiment the dopants are selected from the group consisting of Ce and Mn in an amount of less than <0.5 ppm of the selected dopant. In a further embodiment the dopant and amount is 2-500 ppm Mg. In a different embodiment the dopant and amount is 10-100 ppm Mg. In an additional embodiment the ratio of 515/380 nm transmission loss is less than 0.2 after exposure to greater than 2.8 MRads of γ-radiation. In a further embodiment the ratio of 515/380 nm transmission loss of less or equal to 0.1 after exposure to greater than 2.8 MRads of γ-radiation. The laser optic can also have a coating thereon, the coating being at least one material selected the group consisting of $SiO_2.F$, $Al_2O_3$, $MgF_2$, $BaF_2$, $CaF_2$, $SrF_2$, NaF, LiF, $AlF_3$, $LaF_3$, $GdF_3$, $NdF_3$, $DyF_3$, $YF_3$ and $ScF_3$.

In another embodiment the invention is directed to a laser optic having improved laser durability, the optic comprising a $CaF_2$ single crystal material doped with 20-100 ppm Mg, and optic having a ratio of 515/380 nm transmission loss of less than or equal to 0.2 after exposure to greater than 2.8 MRads of γ-radiation. In one embodiment the ratio of 515/380 nm transmission loss is less than or equal to 0.1 after exposure to greater than 2.8 MRads of γ-radiation. In a further embodiment the optic has a coating thereon, said coating being at least one material selected the group consisting of $SiO_2.F$, $Al_2O_3$, $MgF_2$, $BaF_2$, $CaF_2$, $SrF_2$, NaF, LiF, $AlF_3$, $LaF_3$, $GdF_3$, $NdF_3$, $DyF_3$, $YF_3$ and $ScF_3$.

The invention is also directed to a doped $CaF_2$ crystal suitable for making laser optics having improved laser durability, said crystal consisting of $CaF_2$ as the major component, and at least one dopant selected from the group consisting of the group consisting of >0.3-1200 ppm Mg, >0.3-200 ppm Sr, >0.3-200 ppm Ba. In one embodiment the dopant and amount is 2-500 ppm Mg. In another embodiment the dopant and amount is 10-100 ppm Mg.

In another embodiment the crystal has a ratio of 515/380 nm transmission loss of less than 0.3 after exposure to greater than 2.8 MRads of γ-radiation. In an additional embodiment the crystal has a ratio of 515/380 nm transmission loss of less than 0.2 after exposure to greater than 2.8 MRads of γ-radiation. In a further embodiment the crystal has a ratio of 515/380 nm transmission loss of less than or equal to 0.1 after exposure to greater than 2.8 MRads of γ-radiation.

DETAILED DESCRIPTION

Figure 1:
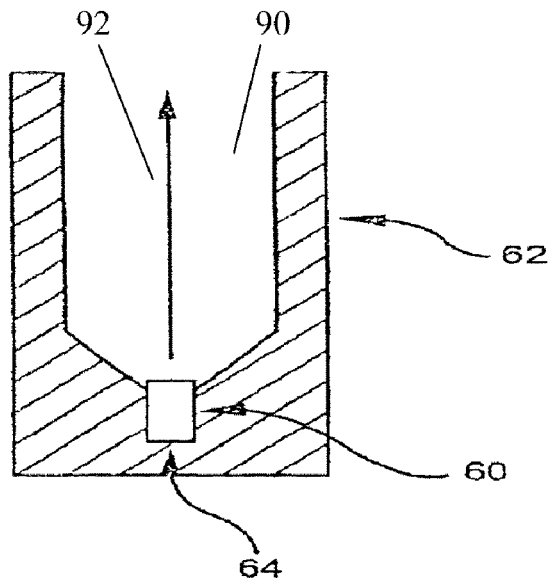
FIG. 1 (prior art) illustrates a crystal growth crucible having a seed crystal reservoir and the axial orientation direction of the seed crystal.

As used herein the terms 'calcium fluoride crystal" and "calcium fluoride optic" means a calcium fluoride crystal, or optic made therefrom, containing at least one dopant as specified herein and in an amount within the range given for each dopant as specified herein. The crystal can be a single crystal such as is grown by the Bridgman method, the Bridgman-Stockbarger method and other methods known in the art, or it can be a crystal formed by heating a calcium fluoride powder or plurality of small crystals under pressure at a temperature such that the powder or plurality of crystals fuse to form a calcium fluoride crystal as is also known in the art. These processes are typically conducted under vacuum, in an inert or fluorinating atmosphere, or under conditions containing only minor amounts of oxygen. Examples of crystals of alkaline earth metal fluorides grown using the Bridgman, Bridgman-Stockbarger, and Czochralski methods, or variations thereof, can be found in, for example without limitation, U.S. Pat. Nos. 7,033,433, 6,989,060, 6,929,694, 6,702,891, 6,704,159, 6,806,039, 6,309,461 and 6,123,764. The crystals can be made into optics by methods well known in the art.

As used herein the terms "calcium fluoride single crystal", "calcium fluoride single crystal optic", and similar terms including the word "doped", mean a single crystal of calcium fluoride, or optic made therefrom, containing at least one dopant as specified herein and in an amount within the range given for each dopant as described herein. Dopant amounts are given in parts-per-million (ppm) by weight of the dopant metal ion in the crystal.

Further, it is to be recognized that the $CaF_2$ crystals can contain, in addition to the intentional metal dopants described herein, very low levels of other "contaminants", for example without limitation, contaminants such as those specified herein. All such contaminants are to be deemed as due to the inability to absolutely eliminate such materials from the feedstock or processing environment, and are not to be deemed as being intentionally present or affecting the durability of the doped $CaF_2$ crystals and optics of the invention. In the art cited above for making $CaF_2$ crystals it was preferred that the doped calcium fluoride feedstock is such that the final crystal optic product has impurity levels, by weight as measured by ion-coupled plasma mass spectroscopy (ICP-MS) or other appropriate method known in the art, of less than 0.1 ppm Li, less than 4 ppm Na, less than 3 ppm K, less than 0.2 ppm Sc, less than 0.2 ppm Y, less than 0.2 ppm La, less than or equal to 0.2 ppm Gd, less than 0.2 ppm Yb, less than 0.2 ppm Ti, less than 0.1 ppm Cr, less than 0.5 ppm Mn, less than 0.4 ppm Fe, less than 0.2 ppm Co, less than 0.2 ppm Ni, and less than or equal to 0.3 ppm Cu. Preferably the calcium fluoride raw material has less than or equal to 0.5 ppm Na and 0.5 ppm K. The total of such contaminants is generally less than 50 ppm.

The dopants can be added to the $CaF_2$ feedstock used to make the $CaF_2$ crystal as a fluoride, oxide, carbonate, or finely powdered metal. The mixture of $CaF_2$ powder and dopant is treated with an oxygen scavenger such as $CF_4$, $SnF_2$ or $PbF_2$ to remove oxygen. When a metal powder is used as the dopant, the scavenger treatment also converts the metal to metal ions as well as removes oxygen. Similarly, the scavenger helps in removing oxygen from metal oxide dopant thereby converting it to a metal fluoride.

The doped $CaF_2$ crystals used in the γ-ray tests described below were grown using a crystal growth and annealing apparatus as described in the '461 patent. Summarizing, the apparatus as described in the '461 patent has a primary heating system mounted near the top and sides of the crystal and a secondary heating system mounted near the bottom of the crystal. This secondary heating system may or may not be used during the production of the doped crystals. The method, generally, of the '461 patent used to make the crystals described herein has steps of (1) forming a liquid of crystal material, including the dopant, in a crucible by heating the crystal material using heat from the primary heating system; (2) lowering the crucible out of the primary heating system so that successive portions of the liquid crystal material cool to a temperature suitable for crystal formation; (3) reducing the temperature of the primary heating system; (4) raising the crucible into the primary heating system and supplying heat from the secondary heating system; and (5) reducing the heat output of the primary and secondary heating systems so that the average temperature of the crystal is cooled over time. It is especially important to maintain a low temperature gradient during the initial phases of cooling, when the hot crystal has relatively low yield strength. Cooling times in the range of 20-40 days are described in the '461 patent. However, in the preferred case cooling times may be on the order of 10 to 25 days.

Figure 2:
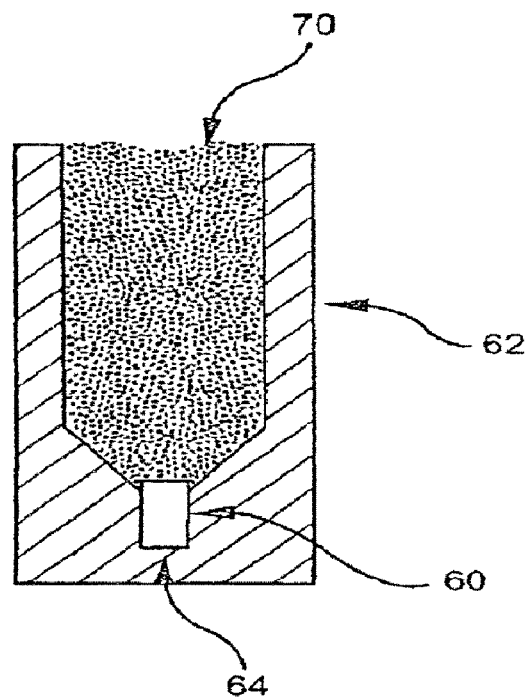
FIG. 2 (prior art) illustrates the growth crucible of FIG. 1 loaded with doped $CaF_2$ feedstock.

The growth of crystals of selected orientation, for example, a <111>, <110> or <100> crystal can be done by using a crucible having a reservoir in its bottom, as illustrated in FIGS. 1 and 2, into which, for example, a <111> seed crystal is placed. After the doped $CaF_2$ has been prepared it can be annealed to reduce stresses within the crystal and the birefringence that may result from such stress. Such annealing methods have been described in the art; for example, in U.S. Pat. No. 6,806,039.

Figure 3:
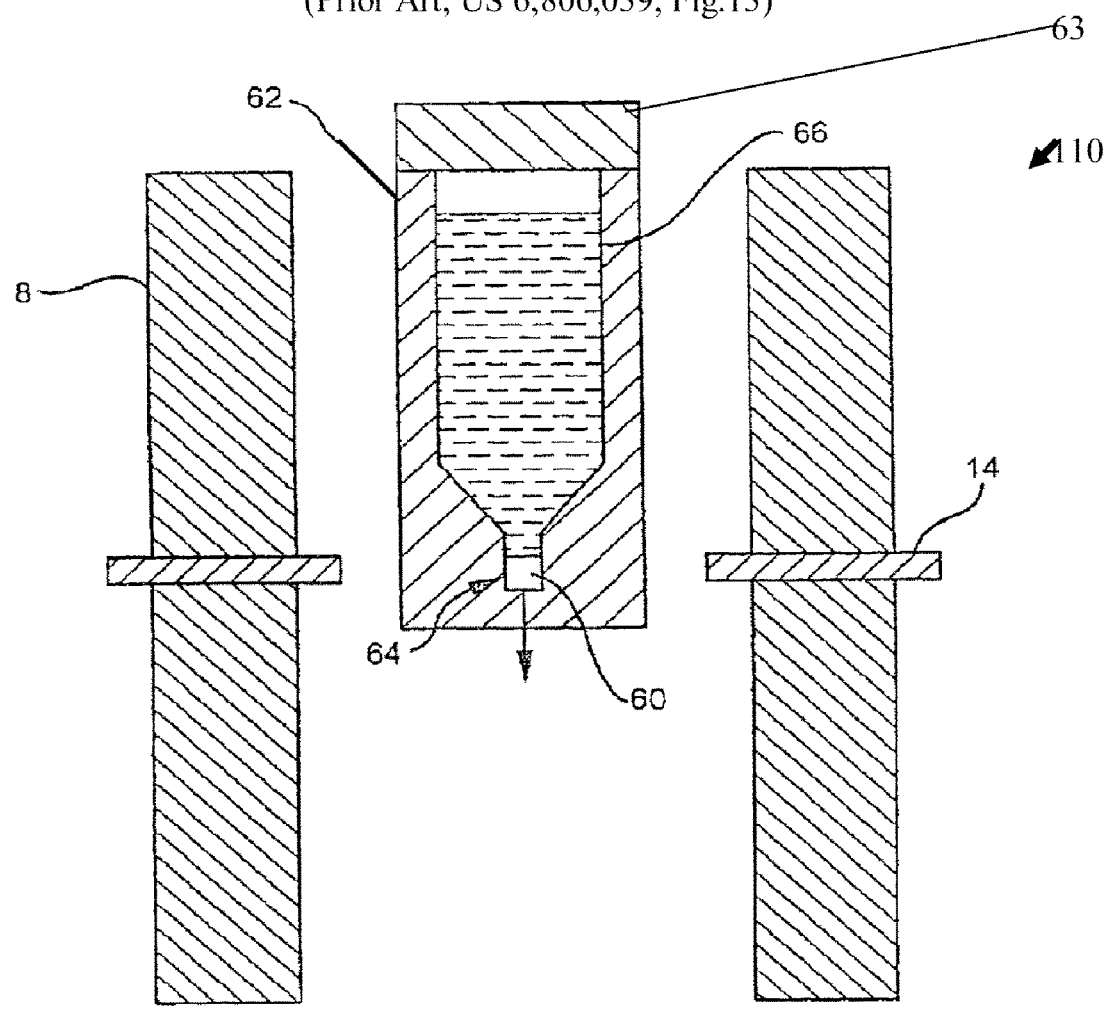
FIG. 3 illustrates the crucible of FIG. 2 contained within the upper zone of a two zone furnace, the feedstock and the upper part of the part of the seed crystal having been melted.

The doped crystals of the invention can also be grown using the method described in the '039 patent. FIGS. 1-3 herein illustrate the some of features of the crystal growth process described in the '039 patent and briefly summarized as follows. Lead fluoride was used as an oxygen scavenger.

FIG. 1 shows a crystal growth crucible 62 for growing doped crystal having a crystal growth chamber and a seed crystal orientation receiver 64 for receiving and orienting a seed crystal 60 in relation to the adjoining above crystal growth chamber (designated herein 90). Arrow 92 shows the preferred crystal axis direction of the seed crystal. FIG. 2 shows the growth crucible loaded with the seed crystal 60 and the $CaF_2$ feedstock 70 containing the selected dopants as described herein. In the preferred case, a seed crystal may not be used during the crystal growth process. The optical crystal is later removed from the large bulk crystal in a manner that provides an optical element whose surfaces have the desired crystallographic orientation. The machining techniques used to produce this optical element with the desired crystallographic surface orientations are known in the art. FIG. 3 shows the crystal growth crucible 62, with lid 63 thereon, containing the doped feedstock as a melt 66 with an upper portion of seed crystal 60 melted. The doped feedstock was melted in the upper hot melt zone of controlled atmosphere vacuum furnace 110. Controlled atmosphere/vacuum furnace 110 was heated by resistive graphite heating elements 8. An insulating furnace baffle 14 preferably separates the upper and lower heating elements to isolate the lower cool anneal zone (below the baffle) from the upper hot melt zone (above the baffle) and forms there between a crystal growth temperature gradient. The partially melted crystal seed 60 and melted doped feedstock 66 is progressively moved through the crystal growth temperature gradient to grow a seeded oriented doped $CaF_2$ crystal. After the single crystal is fully grown it can be cooled as described herein or elsewhere in the art within the lower portion of the growth furnace or it can be cooled and moved to a separate annealing furnace according to the schedule given above or other annealing schedules known in the art.

It is recognized to those skilled in the art that the local concentration of a specific dopant may vary axially throughout the crystal. The degree of dopant variation is dependent upon the segregation coefficient of the dopant within the material, the rate of crystal growth, the diffusivity of the dopant within the molten material, and the convective state of the molten material during growth. Careful measurements made using ICP-MS have been used to identify the amount of dopant present in the optical elements tested. It is the actual measured dopant concentration values which are discussed herein.

Figure 5:
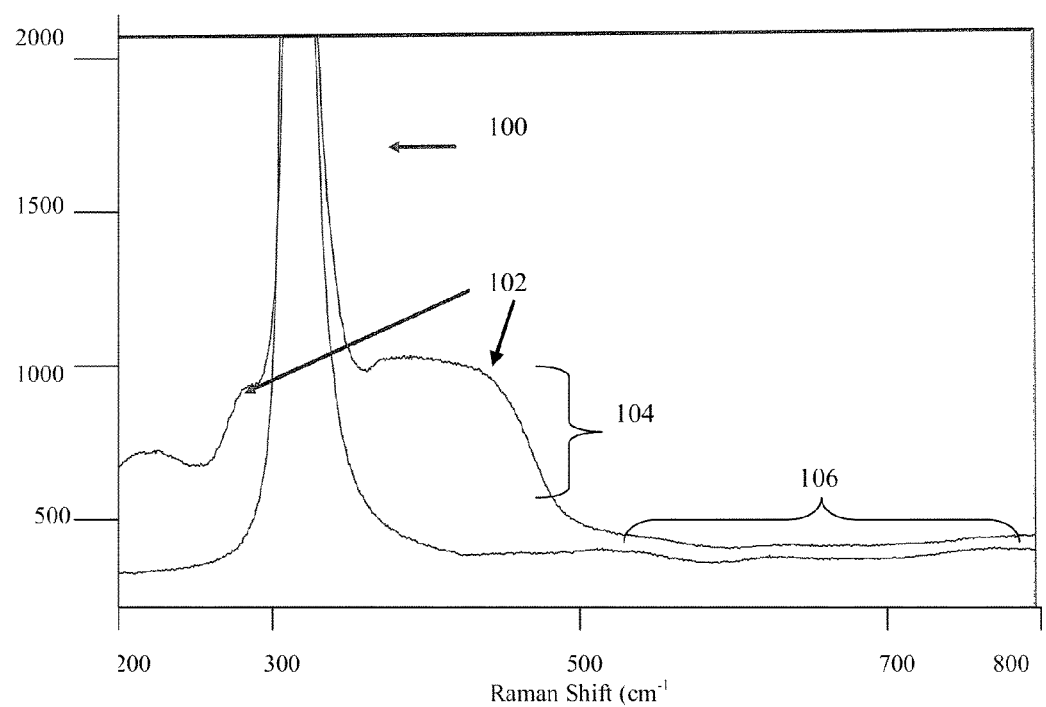
FIG. 5 is the Raman spectrum illustrating the formation of colloids in un-doped $CaF_2$ crystal.

As stated above, it is known that polished but uncoated surfaces of $CaF_2$ are susceptible to degradation when exposed to powerful lasers operating in the DUV and VUV ranges. For example, when using 193 nm lasers operating at 2-9 KHz with pulse densities of 20-80 $mJ/cm^2$, the surfaces or the optical elements made from these ionic materials are known to fail after only a few million laser pulses. R. Bennewitz et al, "*Bulk and surface processes in low-energy-electron induced deposition of $CaF_2$*", Amer. Physical Society, Physical Review B, Vol. 59, No. 12 (1999), pages 8237-8246, suggest that the cause of the damage is thought to be fluorine diffusion from the bulk of the crystal to the surface. Bennewitz et al indicate that metal (Ca) formation was observed on the surface of the crystal and that "Colloid formation [in the crystal] results from aggregation of F centers, a process favored in $CaF_2$ by the good match between the lattice structure and atomic spacing of calcium metal and the $Ca^{2+}$ sublattice in $CaF_2$." FIG. 5 shows the Raman spectrum of $CaF_2$ before and after exposure to 193 nm laser radiation. The change in the Raman spectra demonstrates the existence of Ca colloids in $CaF_2$ after exposure spectrum to 193 nm laser radiation. U.S. Pat. No. 6,466,365 (the '365 patent) describes a method of protecting metal fluoride surfaces, such as $CaF_2$, from degradation by use of a vacuum deposition, of a silicon oxyfluoride coating/material. While for the moment this is a reasonable solution, the microlithographic industry constantly demands more performance from excimer sources, and consequently from optical components used in connection with excimer laser based systems. In particular, the industry would prefer to use uncoated $CaF_2$ optics because of the reduced costs, better transmission, and the general outlook that the less complex the optic, the less likely it is that something will go wrong. The lithographic industry is currently seeking optics that can survive as many as 50 billion pulses of 20-80 $mJ/cm^2$ with an acceptably low level of degradation over this period. Coating the optics, by itself, is believed insufficient to reach this goal without improvements in the laser durability of the bulk material.

Disclosed herein are optics made of single crystal $CaF_2$ doped with one or more dopant materials in specific amounts selected from the group consisting of Mg, Sr and Ba ("dopant") in order to extend the lifetime of the $CaF_2$ optic when it is used in high power laser systems; for example, lasers operating at 193 nm, 2-9 KHz, with pulse energy densities of 20-80 $mJ/cm^2$. The amount of each dopant selected to add to $CaF_2$ is from within the following ranges; >0.3-1200 ppm Mg, >0.3-200 ppm Sr. and >0.3-200 ppm Ba. Each of these dopants form solid solutions with $CaF_2$ within the given concentration ranges. Each dopant also has an atomic radius that differs from the Ca ion within the crystal lattice. The ionic radii values (Pauli, in Angstroms) are Mg=0.69, Ca=0.99, Sr=1.13 and Ba=1.45. This difference in atomic radii distorts the crystal lattice in a manner that reduces the time required for the recombination of excitons created with the $CaF_2$ structure by exposure to laser irradiation. While the addition of one or more dopants reduces the exciton lifetime, it does not prevent the formation of all lattice defects caused by exposure to radiation. However, the addition of one or more dopants does appear to inhibit the formation of Ca colloids that are typically associated with laser damage in $CaF_2$ single crystals In one embodiment, the present invention is directed to an alkaline earth crystal consisting of $CaF_2$ as the major component and at least one dopant selected from the group consisting of >0.3-1200 ppm Mg, >0.3-200 ppm Sr, >0.3-200 ppm Ba. In another embodiment the dopants are selected from the group consisting of Ce and Mn in an amount of less than <0.5 ppm of the selected dopant. In another embodiment the alkaline earth single crystal consists of $CaF_2$ as the major component and at least one dopant selected from the group consisting of >2-500 ppm Mg, >2-100 ppm Sr, >2-100 ppm Ba. In a further embodiment the invention consists of $CaF_2$ as the major component and at least one dopant selected from the group consisting of >10-100 ppm Mg, 5-50 ppm Sr, >2-10 ppm Ba. In an additional embodiment the alkaline earth single crystal consists of $CaF_2$ as the major component and at least one dopant selected from the group consisting of >20-100 ppm Mg, 1.0-200 ppm Sr, and >1.0-200 ppm Ba. In a further embodiment $CaF_2$ is the major component and the dopant is 20-60 ppm Mg.

Mixed alkaline earth metal fluorides have been described in the both the patent and technical literature. For example, U.S. Pat. Nos. 6,806,039, 6,630,117, 6,649,326, and U.S. Patent Publication No. 2003/0104318, describe making mixed alkaline earth fluoride single crystals of general formula $M^1_x M^2_{(1-x)} F_2$ where x is in the range of 0.1-0.9; such mixed metal crystals all containing greater than 10,000 ppm of the lesser of the two alkaline earth metal ions. V. Denks et al., "*Excitonic processes in pure and doped $CaF_2$*," J, Phys. Condens. Matter, Vol. 11 (1999), pages 3115-3125, investigated $CaF_2$ doped with Mg, Mn, Na and Li ions. The authors investigated $CaF_2$ crystals doped with (a) Mg ions in amounts in the range of 0.01-0.1% (page 3117) or 0.2% Mn ions (page 3119). In their conclusion on page 3124, regarding impurities [dopants], they stated "None of the impurities (Mg or Mn) described in the present paper led to an improvement of the radiation stability of CaF$_2$." This conclusion was based upon their fluorescence measurements and is contrary to concepts and information put forth herein. In addition, Denks et al. state, without specification, that they did find an impurity which might raise the radiation resistance of CaF$_2$. In a subsequent paper, V. Denks et al., "*Impurity-Related Excitonic Processes in CaF$_2$—Sr*", Phys, Stat. Sol. (a), Vol. 191. No. 2, (2002), pp. 628-632 describes a CaF$_2$:Sr single crystals in which Sr ranges from 0.05 to 4 mol % (0.05 mol %=~561 ppm or 0.6 wt % Sr). In this subsequent paper, Denks et al. conclude that doping CaF$_2$ with Sr at this high level may impart increased durability to radiation exposure. In some patents, for example, U.S. Pat. No. 6,699,408, Mg, Sr and Ba were regarded as impurities in CaF$_2$ and were kept to level below 0.5 ppm Mg, 19 ppm Sr and 5 ppm Ba. Neither do these patents recognize the ability of these specific metallic ions at specific dopant levels to impart increased laser durability to CaF$_2$.

It is also highly desirable to have an accelerated test by which doped single crystal CaF$_2$ optics can be laser durability tested. Presently, the accelerated test methods use a very high power excimer laser and can last anywhere from a few days to several weeks. This method of testing is both expensive and time consuming Other methods (for example, laser fluorescence as cited above in Denks et al.) have been investigated to determine whether they could accurately indicate a CaF$_2$ optic's laser durability; however, these methods have only met with limited success. Currently, the only viable method to "rapidly" evaluate the improved laser durability of doped CaF$_2$ optical elements was suggested by T. D. Henson et al. in "Space radiation testing of radiations resistant glasses and crystals", Proc, SPIE. V4452 (1001), pp 54-65. Henson et al. suggest that transmission testing after exposure to γ-radiation serves as a viable test method of the durability of CaF$_2$ optics. Therefore, this method was employed to evaluate doped CaF$_2$ samples as described in this disclosure. Samples of doped and un-doped CaF$_2$ optics having a thickness of 7 mm were exposed to a dose of between 28.3 and 28.7 kGy (2.83-2.87 MRad) using a gamma-ray [γ-ray] source. The transmission spectra from 200 to 1000 nm of the samples were tested before exposure and again at 25, 100, 430 and 600 hours after γ-radiation exposure. It was found that the doped CaF$_2$ crystals with improved laser durability had a lower ratio of 515/380 transmission loss than undoped CaF$_2$ material had. The 515/380 transmission loss ratio is defined as the decrease in transmission at 515 nm after exposure compared to before exposure divided by the similar loss in 380 nm transmission after exposure compared to before exposure. These particular wavelengths are compared because the presence of Ca colloids results in absorption at around 515 nm while F center presence results in absorption at around 380 nm (an F center is a fluoride ion vacancy with one electron is in the vacancy). During the course of the evaluation of the irradiated doped and undoped (D and UD) samples, it was found that while both the D and UD samples have F centers (decreased 380 nm transmission), the D samples do not appear to making colloids whereas the UD do make colloids (decreased 515 transmission). This result is particularly impressive since the precursor to colloid formation is the presence of F centers. Apparently, at low concentrations of a dopant such as Mg as used in the present sample optics, the dopant inhibits colloid formation which in turn improves laser lifetime.

Figure 4:
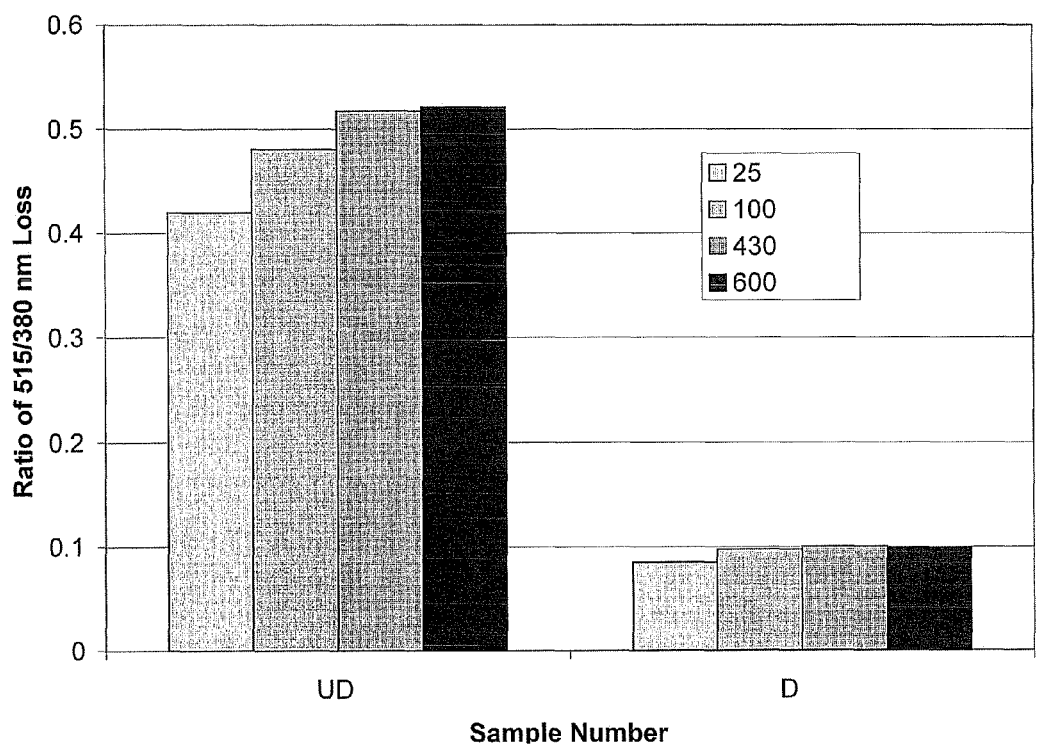
FIG. 4 illustrates the change in the ratio of 515/380 nm transmission loss for un-doped and Mg-doped $CaF_2$.

Generally, it was found that un-doped CaF$_2$ optic samples (UD) had a loss ratio after exposure greater than 0.4 and that the ratio increased on the order of 25% as transmission recovery after exposure increased, though the increase was at a gradually leveling-out rate. In contrast, the doped CaF$_2$ optic samples (D) has a loss ratio of less than 0.3 throughout the entire evaluation period indicating less colloid formation for given amount of F center formation. In some embodiments the loss ratio of the D optic samples was less then 0.2. In the example shown in FIG. 4 the loss ratio was less than or equal to 0.1. The D optics contained were Mg-doped in the range of 10-100 ppm, preferably in the range of 20-80 ppm.

Thus, in one embodiment the invention is directed to a laser optic comprising a CaF$_2$ crystal material doped with a selected amount of a selected dopant whose purpose is to inhibit the formation of Ca colloids and thereby impart improved laser durability to the optical element. The purpose of the selected dopant is to inhibit the formation of Ca colloids and thereby impart improved laser durability to the optical element. In one embodiment the colloid inhibiting dopant and amount is one selected from the group consisting of >0.3-1200 ppm Mg, >0.3-200 ppm Sr, >0.3-200 ppm Ba is added to inhibit the formation of Ca colloids. In another embodiment the colloid inhibiting dopant is Mg in an amount in the range of 2-500 ppm. In further embodiment the colloid inhibiting dopant is Mg in an amount in the range of 10-100 ppm. The foregoing laser optics have a ratio of 515/380 nm transmission loss of less than 0.3 after exposure to greater than 2.8 MRads of γ-radiation. In one embodiment the ratio of 515/380 nm transmission loss of less than 0.2 after exposure to greater than 2.8 MRads of γ-radiation. In another embodiment the ratio of 515/380 nm transmission loss of less than or equal to 0.1 after exposure to greater than 2.8 MRads of γ-radiation.

The doped CaF$_2$ optics according to the invention can be coated or uncoated. The coating materials can be a materials selected from the groups consisting of fluoride, oxide and fluorinated oxide films which are applied to the surfaces of the optic using advanced plasma techniques known in the art. Example of such coating materials and the techniques for coating optics can be found in the commonly-owned U.S. Pat. No. 7,242,843 and citations therein whose teachings are incorporated by reference. The coating material can be applied directly to the optic. Coating materials include SiO$_2$.F, Al$_2$O$_3$, MgF$_2$, BaF$_2$, CaF$_2$, SrF$_2$, NaF, LiF, AlF$_2$, LaF$_3$, GdF$_3$, NdF$_3$, DyF$_3$, YF$_3$ and ScF$_3$. The optics to be coated include prisms, windows and lenses, and can further include mirrors made of CaF$_2$.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

We claim:

1. A laser optic having improved laser durability, said optic comprising a CaF$_2$ crystal material doped with a selected amount of a selected dopant, and said optic having a ratio of 515/380 nm transmission loss of less than 0.3 after exposure to greater than 2.8 MRads of γ-radiation;

wherein the dopant and amount is 25-1200 ppm Mg.

2. The laser optic according to claim 1, wherein the dopant and amount is 25-500 ppm Mg.

3. The laser optic according to claim 1, wherein the dopant and amount is 25-100 ppm Mg.

4. The laser optic according to claim 1, wherein the ratio of 515/380 nm transmission loss is less than 0.2 after exposure to greater than 2.8 MRads of γ-radiation.

5. The laser optic according to claim 1, wherein the ratio of 515/380 nm transmission loss of less or equal to 0.1 after exposure to greater than 2.8 MRads of γ-radiation.

6. The laser optic according to claim 1, wherein the crystal optic has impurity levels, by weight, of less than 0.1 ppm Li, less than 4 ppm Na, less than 3 ppm K, less than 0.2 ppm Sc, less than 0.2 ppm Y, less than 0.2 ppm La, less than or equal to 0.2 ppm Gd, less than 0.2 ppm Yb, less than 0.2 ppm Ti, less than 0.1 ppm Cr, less than 0.5 ppm Mn, less than 0.4 ppm Fe, less than 0.2 ppm Co, less than 0.2 ppm Ni, and less than or equal to 0.3 ppm Cu.

7. A laser optic having improved excimer laser durability, said optic comprising a $CaF_2$ single crystal material doped with 25-100 ppm Mg, and optic having a ratio of 515/380 nm transmission loss of less than 0.2 after exposure to greater than 2.8 MRads of γ-radiation.

8. The laser optic according to claim 7, wherein said optic has a coating thereon, said coating being at least one material selected the group consisting of $SiO_2.F$, $Al_2O_3$, $MgF_2$, $BaF_2$, $CaF_2$, $SrF_2$, NaF, LiF, $AlF_3$, $LaF_3$, $GdF_3$, $NdF_3$, $DyF_3$, $YF_3$ and $ScF_3$.

9. A laser optic having improved laser durability, said optic comprising a $CaF_2$ single crystal material doped with 25-100 ppm Mg, and optic having a ratio of 515/380 nm transmission loss of less than 0.1 after exposure to greater than 2.8 MRads of γ-radiation.

10. The laser optic according to claim 9, wherein said optic has a coating thereon, said coating being at least one material selected the group consisting of $SiO_2.F$, $Al_2O_3$, $MgF_2$, $BaF_2$, $CaF_2$, $SrF_2$, NaF, LiF, $AlF_3$, $LaF_3$, $GdF_3$, $NdF_3$, $DyF_3$, $YF_3$ and $ScF_3$.

* * * * *